(12) United States Patent
Kopp et al.

(10) Patent No.: US 6,891,992 B2
(45) Date of Patent: May 10, 2005

(54) CONFIGURABLE ADD-DROP FILTER UTILIZING CHIRAL FIBER GRATINGS

(75) Inventors: Victor Il'ich Kopp, Flushing, NY (US); Azriel Zelig Genack, New York, NY (US)

(73) Assignee: Chiral Photonics, Inc., Clifton, NJ (US)

( * ) Notice: Subject to any disclaimer, the term of this patent is extended or adjusted under 35 U.S.C. 154(b) by 98 days.

(21) Appl. No.: 10/121,893

(22) Filed: Apr. 12, 2002

(65) Prior Publication Data

US 2002/0150330 A1 Oct. 17, 2002

Related U.S. Application Data

(60) Provisional application No. 60/283,585, filed on Apr. 13, 2001.

(51) Int. Cl.[7] ............................................. G02B 6/293

(52) U.S. Cl. .......................................... 385/24; 385/15
(58) Field of Search ............................................ 385/24

(56) References Cited

U.S. PATENT DOCUMENTS

| | | | |
|---|---|---|---|
| 5,619,355 A | * | 4/1997 | Sharp et al. ................... 349/78 |
| 5,907,427 A | * | 5/1999 | Scalora et al. ............... 359/248 |
| 6,545,783 B1 | * | 4/2003 | Wu et al. ..................... 385/127 |

* cited by examiner

Primary Examiner—John R. Lee
Assistant Examiner—Phillip Johnston
(74) Attorney, Agent, or Firm—Edward Etkin, Esq.

(57) ABSTRACT

An add-drop filter, utilizing chiral couplers, that enables a new signal to be added at a particular vacuum wavelength $\lambda'_k$ to a fiber optic line carrying n signal channels over a band of wavelengths encompassing $\lambda_1 \ldots \lambda_{k-1}, \lambda_k, \lambda_{k+1} \ldots \lambda_n$, while an existing signal, $\lambda_k$, is simultaneously dropped from the signal group.

64 Claims, 6 Drawing Sheets

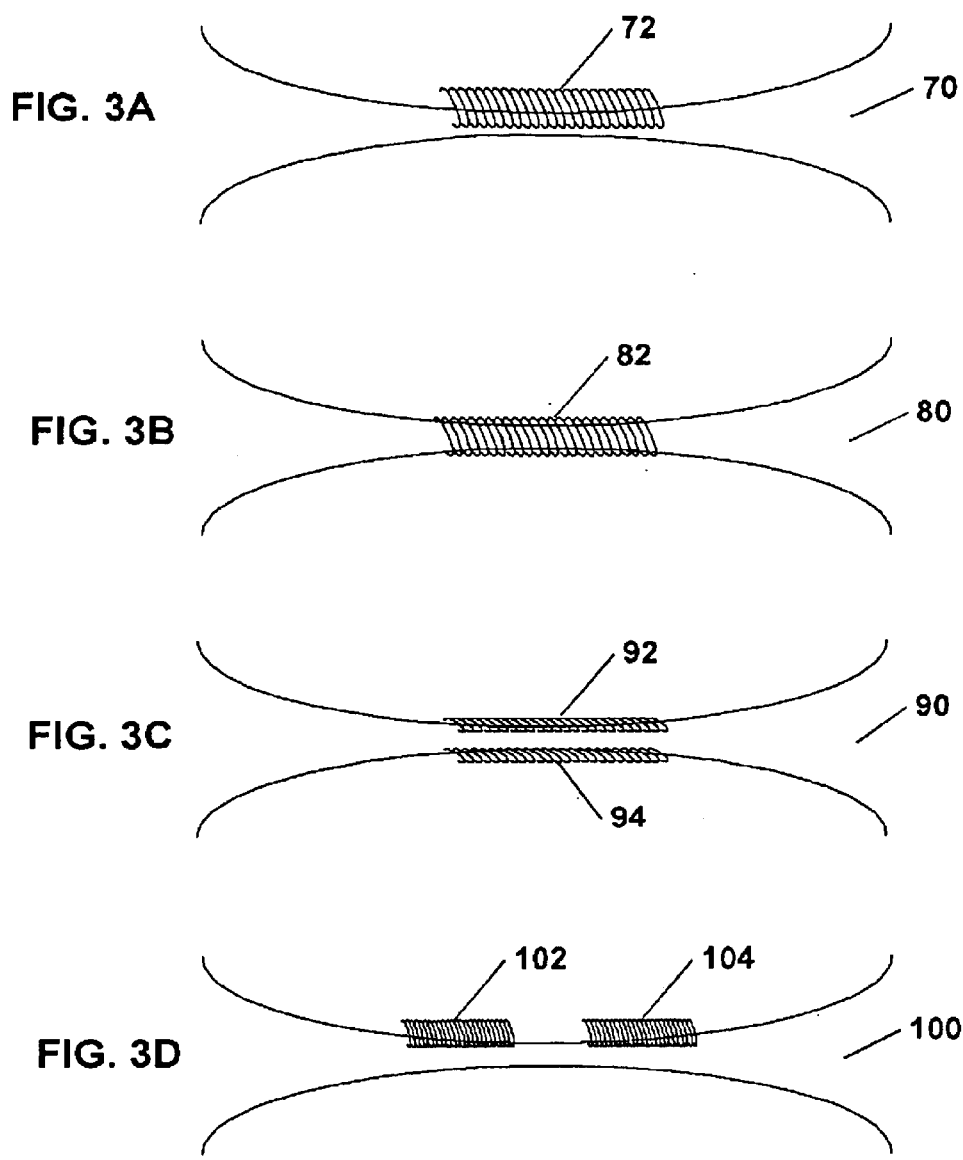

CONFIGURABLE ADD-DROP FILTER UTILIZING CHIRAL FIBER GRATINGS

CROSS REFERENCE TO RELATED APPLICATIONS

The present patent application claims priority from the commonly assigned U.S. provisional patent application Ser. No. 60/283,585 entitled "Configurable Add-Drop Filter Utilizing Resonant Optical Activity" filed Apr. 13, 2001.

FIELD OF THE INVENTION

The present invention relates generally to optical filters utilizing Bragg grating type structures, and more particularly to an add-drop filer based on chiral fiber gratings.

BACKGROUND OF THE INVENTION

Add-drop filters have many industrial applications—for example in information processing, in telecommunication systems, and especially in optical fiber communication systems utilizing wavelength division multiplexing (WDM). An add-drop filter enables a new signal to be added at a particular wavelength $\lambda'_k$ to a fiber optic line carrying n signal channels over a band of wavelengths encompassing $\lambda_1 \ldots \lambda_{k-1}, \lambda_k, \lambda_{k+1} \ldots \lambda_n$, while an existing signal, $\lambda_k$ is simultaneously dropped from the signal group. This functionality is essential in telecommunication systems. Previously known add-drop filters are relatively complex devices that require several expensive components, such as polarization converters that not only increase the filter's cost but also add to its complexity.

Presently used add-drop filters are mostly based on fiber Bragg Gratings (FBGs). FBGs are typically manufactured through irradiating an optical fiber made from a UV-sensitive material with UV light using a pre-designed phase mask. Another prior-art approach to manufacturing fiber Bragg gratings involves irradiating a UV-sensitive optical fiber with two interfering UV laser beams. However, the previously known FBGs are relatively expensive and difficult to manufacture. Some of the efficient modern add-drop filters provide better performance than older non-FBG filters, but because they utilize both FBGs and polarization converters, they are relatively expensive and complex and therefore difficult to fabricate.

It would thus be desirable to provide an add-drop filter utilizing a novel construction and inventive chiral elements that advantageously eliminates and replaces components required in previously known add-drop-filers while providing better performance and higher efficiency.

BRIEF DESCRIPTION OF THE DRAWING

In the drawings, wherein like reference characters denote elements throughout the several views:

FIG. 3A is a schematic diagram of a first embodiment of a first type of a chiral coupler utilized in the inventive add-drop filter of FIG. 1 in accordance with the present invention;

FIG. 3B is a schematic diagram of a second embodiment of a first type of a chiral coupler utilized in the inventive add-drop filter of FIG. 1 in accordance with the present invention;

FIG. 3C is a schematic diagram of a third embodiment of a first type of a chiral coupler utilized in the inventive add-drop filter of FIG. 1 in accordance with the present invention;

FIG. 3D is a schematic diagram of a fourth embodiment of a first type of a chiral coupler utilized in the inventive add-drop filter of FIG. 1 in accordance with the present invention;

SUMMARY OF THE INVENTION

Figure 1:
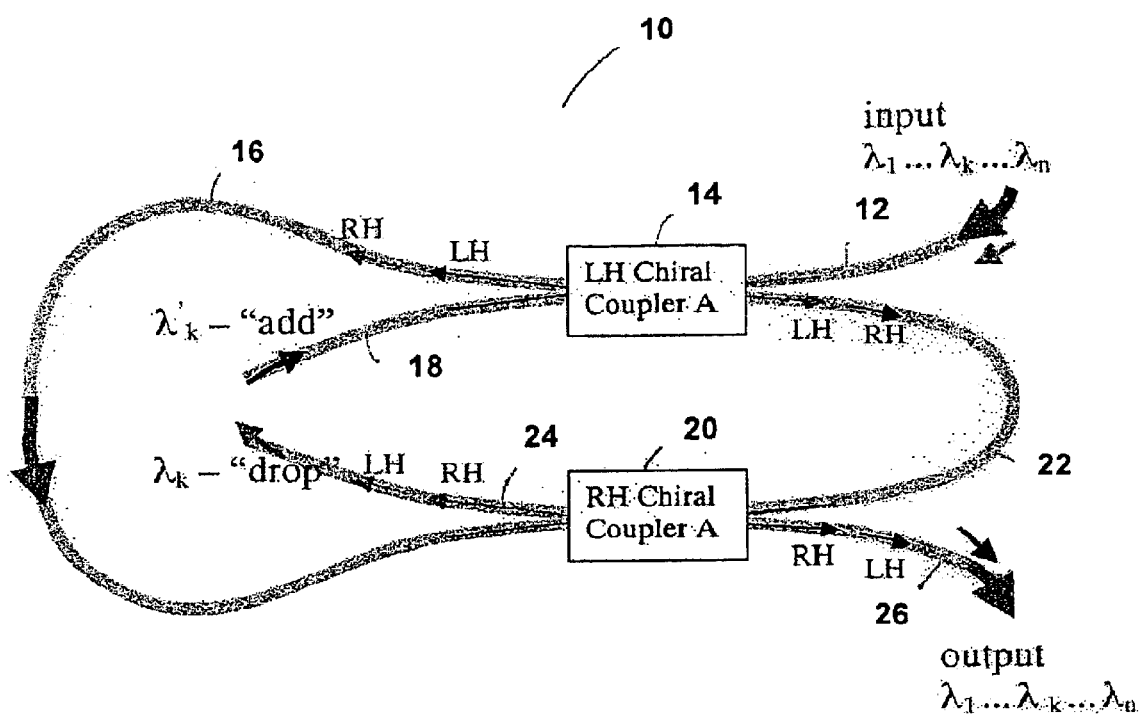
FIG. 1 is a schematic diagram of a first embodiment of an add-drop filter of the present invention.

The present invention is directed to an add-drop filter that utilizes resonant optical activity that enables a new signal to be added at a particular vacuum wavelength $\lambda'_k$ to a fiber optic line carrying n signal channels over a band of vacuum wavelengths encompassing $\lambda_1 \ldots \lambda_{k-1}, \lambda_k, \lambda_{k+1} \ldots \lambda_n$, while an existing signal, $\lambda_k$ is simultaneously dropped from the signal group.

The inventive add-drop optical filter subtracts a drop signal from a target wavelength channel of a multi-channel input signal and adds an add signal into the target wavelength channel. The inventive add-drop optical filter includes an input line for receiving the multi-channel input signal, the input signal comprising a plurality of input signals in a plurality of corresponding channels, and the drop signal in the target wavelength channel, an add line for delivering the add signal at the target wavelength to the input signal; a drop line for transmitting the drop signal in the target wavelength channel separate from the main input signal; a pair of chiral couplers, each with a predetermined redirection (e.g., reflection or coupling) band and optically connected to one another and to at least one of the input, add, and drop lines. The chiral coupler pair acts to: separate the drop signal from the main input signal to generate a modified main signal, direct the drop signal into said drop line, and add the add signal to said modified main signal to generate an output signal. The output signal is then passed to an output line.

The present invention includes multiple advantageous embodiments of the chiral couplers, utilizing one or more fiber gratings (such as fiber Bragg gratings and long period gratings) with or without defects as well as cholesteric liquid crystal or other periodic materials (also with or without defects).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

Before describing the present invention, and in particular the inventive chiral couplers, in greater detail, it would be helpful to provide definitions of common terms utilized in the dielectric lasing art. "Chiral" materials are not symmetrical, that is they are not identical to their mirror images. Cholesteric materials, such as cholesteric liquid crystals (hereinafter "CLCs"), have multiple molecular layers where molecules in the different layers are oriented on average at a slight angle relative to molecules in other layers. Molecules in consecutive layers are rotated slightly relative to those in the preceding layer. Thus, the average direction of the molecules, known as a "director", rotates helically throughout the cholesteric material. A pitch of a cholesteric material is defined as a thickness of the material in which the director rotates a full 360 degrees. Cholesteric structures also have a property called "handedness"—they may be right-handed or left-handed depending on the direction of rotation of the molecules from layer to layer. The handedness of a cholesteric structure influences the circular polarization of light passing through and reflected by the structure.

Periodic dielectric structures (such as layered structures with varying dielectric constants or chiral structures) have a particular reflection band (hereafter referred to as a "photonic stop band") which is the result of its periodic structure—a range of wavelengths for a given polarization of light where there is no transmission of light through the structure due to reflection.

In all layered periodic systems, and CLC systems, the wavelength inside the medium at the center of the band gap is twice the period of the structure. In CLC structures, the band gap exists only for the circular polarized component of light, which has the same sense of rotation as the structure. The second circular component is unaffected by the structure.

The commonly assigned co-pending U.S. Patent Applications entitled "Chiral Fiber Grating" and "Apparatus and Method for Fabricating Chiral Fiber Gratings", which are hereby incorporated herein in its entirety, disclose a number of advantageous chiral fiber elements (and apparatus and method for fabricating them) that exhibit desirable CLC properties in an easy-to-fabricate fiber form. Similarly, other commonly assigned co-pending U.S. Patent Applications entitled "Apparatus and Method for Manufacturing Periodic Grating Optical Fibers", "Apparatus and Method of Manufacturing Chiral Fiber Bragg Gratings" which are hereby incorporated herein in their entirety also disclose other advantageous chiral fiber elements that may be readily utilized in construction of the chiral couplers of the present invention. Finally, the commonly assigned U.S. provisional patent application entitled "Long Period Chiral Fiber Grating and Apparatus and Method of Fabrication Thereof", which is hereby incorporated herein in its entirety, discloses a chiral long period grating element that may also be advantageously utilized in accordance with the present invention.

The present invention is directed to an add-drop filter utilizing chiral elements configured as chiral couplers to enable a new signal to be added at a particular vacuum wavelength $\lambda'_k$ to a fiber optic line carrying signals comprising n channels over a band of wavelengths encompassing $\lambda_1 \ldots \lambda_{k-1}, \lambda_k, \lambda_{k+1} \ldots \lambda_n$, while an existing signal, $\lambda_k$ is simultaneously dropped from the signal group. It should be noted that the add or drop signal may itself include multiple signal channels in a band of wavelengths centered at $\lambda_k$. Thus, while the exemplary embodiments of the present invention refer to a "signal" it is contemplated that multiple channels may exist in the signal without departing from the spirit of the invention.

The inventive add-drop filter may be constructed in several advantageous embodiments in accordance with the present invention. In addition, chiral couplers of several inventive configurations may be utilized in the various embodiments of the present invention as a matter of design choice. In should be noted that the chiral couples are referred to as having a redirection band. A redirection band functions to redirect certain signal components from one fiber to another. This may be accomplished by reflection or by coupling as a matter of design choice without departing from the spirit of the invention. Furthermore, descriptions of the exemplary embodiments of the inventive add-drop filter of FIGS. 1, 2, 5 and 7 refer to "reflection" of signal components, its should be understood that by readily changing connections between the chiral couplers, the signals may be coupled from one fiber to another rather than reflected to achieve the same desired objective of the invention.

Referring now to FIG. 1, a first embodiment of an inventive add-drop filter 10 is shown. The input signal containing the n channels (including the channel to be dropped at the wavelength $\lambda_k$) enters into the filter 10 through the input 12. Each channel of the input signal may be decomposed into both left-handed and right-handed circularly polarized components. The input signal encounters a Left-Handed Chiral Coupler A 14 (hereinafter "LH-CCA 14"), that may be a low index contrast structure configured with a narrow reflection band centered at $\lambda_k$. The LH-CCA 14 is described in greater detail in connection with FIGS. 3A–3D.

The LH-CCA 14 reflects the left-handed component of $\lambda_k$ into a fiber 22, while allowing the rest of the input signal channels, as well as the right-handed component of $\lambda_k$ to pass through to a fiber 16. At the same time, the signal $\lambda'_k$ to be added to the input signal at the wavelength $\lambda_k$, enters the filter 10 through an add channel 18, and has its left-handed component deflected by the LH-CCA 14 into the fiber 16, while its right-handed component passes through the LH-CCA 14 into the fiber 22.

The rest of the input signal and the right-handed component of $\lambda_k$ are directed to a Right-Handed Chiral Coupler A 20 (hereinafter "RH-CCA 20"), also configured with a narrow reflection band centered at $\lambda_k$. Thus, the RH-CCA 20 reflects the right-handed component of $\lambda_k$ into a drop channel 24, while allowing the rest of the input signal channels to pass through to an output channel 26. The left-handed component of $\lambda_k$ arrives to the RH-CCA 20 via the fiber 22 and passes through to the drop channel 24. Thus, both the right- and left-handed components of $\lambda_k$ are directed to the drop channel 24 thereby removing the $\lambda_k$ signal from its channel in the input signal.

At the same time, the left-handed component of the new signal $\lambda'_k$ traveling via the fiber 16 passes through the RH-CCA 20 and enters the output channel 26. The right-handed component of the new signal $\lambda'_k$ traveling via the fiber 22 is reflected by the RH-CCA 20 and also enters the output channel 26. Thus, both the right- and left-handed components of $\lambda'_k$ are directed to the output channel 26 thereby adding the $\lambda'_k$ signal to the $\lambda_k$ channel in the input signal. As a result, the add-drop filter 10 advantageously substitutes the $\lambda'_k$ signal for the $\lambda_k$ signal.

While the lengths of the fibers 16, 22 are shown to be different from one another in FIG. 1, it should be understood, that the lengths of the fibers 16, 22 may be made substantially equal to configure the filer 10 for specific applications as a matter of design choice without departing from the spirit of the invention.

Figure 2:
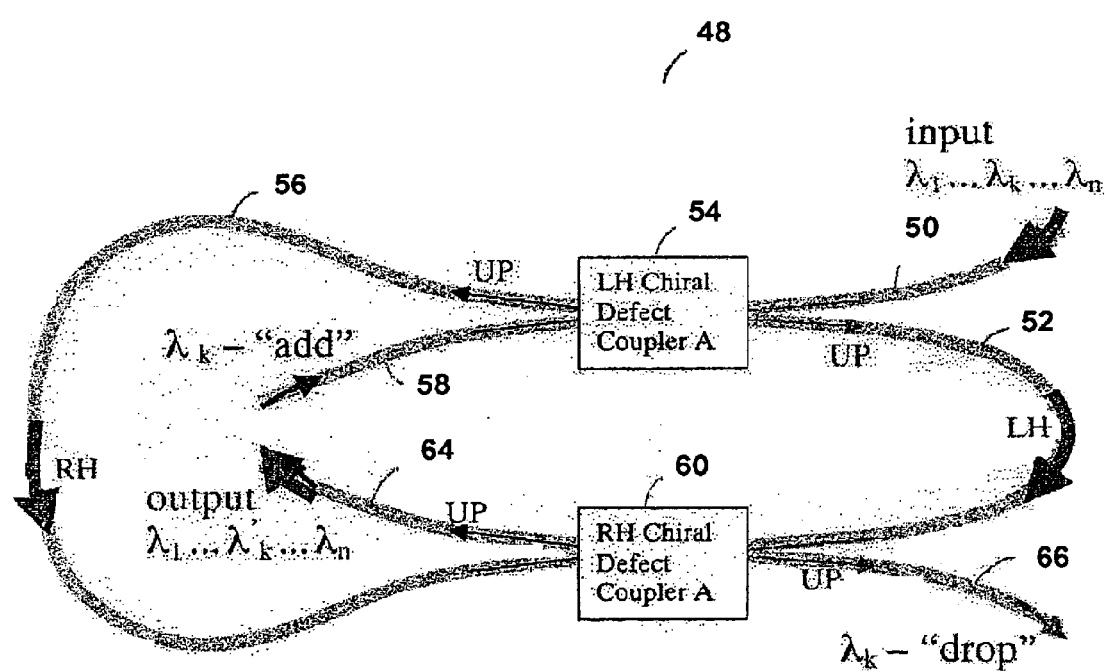
FIG. 2 is a schematic diagram of a second embodiment of an adddrop filter of the present invention.

Referring now to FIG. 2, a second embodiment of an inventive add-drop filter 48 is shown. The input signal containing the n channels (including the channel to be dropped at the wavelength $\lambda_k$) enters into the filter 48 through the input 50. The input signal encounters a Left-Handed Chiral Defect Coupler A 54 (hereinafter "LH-CDCA 54"), which may be a high index contrast structure with a defect configured to reflect both polarization components of a signal at a predetermined defect wavelength of $\lambda_k$, while splitting signals at other wavelengths into right- and left-circularly polarized components. The LH-CDCA 54 is described in greater detail in connection with FIGS. 4A–4D.

Thus, the LH-CDCA 54 completely reflects unpolarized signal $\lambda_k$ into a fiber 52, while splitting the rest of the input signal channels into a right-handed polarized input component that passes through the LH-CDCA 54 into a fiber 56, and a left-handed polarized input component that is reflected into the fiber 52. At the same time, the new signal $\lambda'_k$ to be added to the input signal at the wavelength $\lambda_k$ enters the filter 48 through the add channel 58 and is completely reflected by the LH-CDCA 54 into the fiber 56.

The right-handed component of the input signal and the entire $\lambda'_k$ signal are directed to a Right-Handed Chiral Defect Coupler A 60 (hereinafter "RH-CDCA 60"), also configured to completely reflect both components at the defect wavelength of $\lambda_k$ as well as any right-handed polarized signals. Thus, the new signal $\lambda'_k$ is reflected by the RH-CDCA 60 into an output channel 64, along with the right-handed component of the input signal. The left-handed component of the input signal is delivered to the RH-CDCA 60 via the fiber 52 and passes through to the output channel 64. The unpolarized signal $\lambda_k$, also delivered to the RH-CDCA 60 via the fiber 52, is reflected completely into a drop channel 66. Thus, the add-drop filter 48 advantageously substitutes the $\lambda'_k$ signal for the $\lambda_k$ signal.

While the lengths of the fibers 56, 52 are shown to be different from one another in FIG. 2, it should be understood, that the lengths of the fibers 56, 52 may be made substantially equal to configure the filter 48 for specific applications as a matter of design choice without departing from the spirit of the invention.

Referring now to FIG. 3A, a first embodiment of a chiral coupler 70 is shown. The chiral coupler 70 may be a low index contrast structure with a channel width of approximately equal to $\Delta n/n$. Channel position is determined by the pitch of the structure, so different channels correspond to different values of the pitch. The basic structure of the chiral coupler 70 includes two fibers positioned as to be in proximity with one another for a portion of their length (hereinafter "proximal portion"). A section of one of the fibers is configured to contain a chiral grating (hereinafter "CG") structure 72. In one embodiment of the chiral coupler 70, the pitch of the CG fiber structure 72 is approximately equal to the wavelength $\lambda_k$ divided by the effective refractive index of the fiber at that wavelength. In this case, the CG structure 72 includes a narrow redirection band centered at $\lambda_k$. In another embodiment of the chiral coupler 70, the pitch of the CG structure 72 may be significantly longer than the wavelength $\lambda_k$, for example when the structure 72 utilizes a chiral fiber long period grating. In this case, the CG structure 72 has a coupling band that redirects the appropriate handedness components of the signal at wavelength $\lambda_k$ from a core of the first of two fibers to a core of the second of two fibers. Essentially, the CG structure 72 contains a "redirection band"—a reflection band if a chiral fiber Bragg grating is used or a coupling band if a long period fiber grating is used.

The chiral coupler 70 may be configured to be utilized as the LH-CCA 14 or RH-CCA 20 of FIG. 1. Thus, the chiral coupler 70 is configured either as a left-handed or a right-handed structure. If the chiral coupler 70 is a left-handed structure, then it allows the right-handed component of the signal at k to pass through while redirecting (i.e. reflecting or coupling) the left-handed component. Similarly, if the chiral coupler 70 is a right-handed structure, then it allows the left-handed component of the signal at $\lambda_k$ to pass through while redirecting the right-handed component. Signals having a wavelength outside of the reflection band simply pass through the chiral coupler 70.

The CG fiber structure 72 may be produced and configured in several different ways without departing from the spirit of the invention, for example as disclosed in any of the above-incorporated patent applications, or the CG fiber structure 72 may simply consist of a CLC element.

Referring now to FIG. 3B, a second embodiment of a chiral coupler A 80 is shown. The chiral coupler 80 may be configured to be utilized as the LH-CCA 14 or RH-CCA 20 of FIG. 1. The chiral coupler 80 is substantially similar in functionality to the chiral coupler 70 of FIG. 3A except that the CG fiber structure 82 encompasses both fibers rather than one of the fibers as in the chiral coupler 70. The CG fiber structure 82 may be produced and configured in a variety of advantageous embodiments described in connection with FIG. 3A.

Referring now to FIG. 3C, a third embodiment of a chiral coupler A 90 is shown. The chiral coupler 90 may be configured to be utilized as the LH-CCA 14 or RH-CCA 20 of FIG. 1. The chiral coupler 90 is substantially similar in functionality to the chiral coupler 70 of FIG. 3A, except that each of the two fibers in chiral coupler 90 is provided with an individual proximal CG structure 92 and 94. The CG fiber structures 92 and 94 may be produced and configured in a variety of advantageous embodiments described in connection with FIG. 3A.

Referring now to FIG. 3D, a fourth embodiment of a chiral coupler A 100 is shown. The chiral coupler 100 may be configured to be utilized as the LH-CCA 14 or RH-CCA 20 of FIG. 1. The chiral coupler 100 is substantially similar in functionality to the chiral coupler 70 of FIG. 3A, except that one of the fibers in chiral coupler 100 is provided with two proximal CG structures 102 and 104. The CG fiber structures 102 and 104 may be produced and configured in a variety of advantageous embodiments described in connection with FIG. 3A. In an alternate embodiment of the chiral coupler 100, two additional proximal CG structures may be position on the other fiber of the chiral coupler 100 (not shown) as a matter of design choice.

Figure 4A:
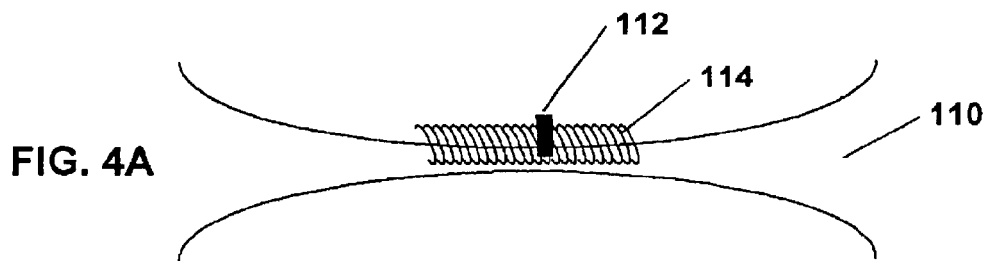
FIG. 4A is a schematic diagram of a first embodiment of a first type of a chiral defect coupler utilized in the inventive add-drop filter of FIG. 2 in accordance with the present invention.

Referring now to FIG. 4A, a first embodiment of a chiral defect coupler A 110 is shown. The chiral defect coupler 110 may be configured to be utilized as the LH-CDCA 54 or RH-CDCA 60 of FIG. 2. Thus, the chiral defect coupler 110 is configured either as a left-handed or a right-handed structure with a defect configured to reflect (or couple) both polarization components of a signal at a predetermined defect wavelength of $\lambda_k$, while splitting signals of other wavelengths into right- and left- circularly polarized components and passing through or reflecting (or coupling) those components in accordance with the handedness of the structure. If the chiral defect coupler 110 is a left-handed structure, then it allows the right-handed components of signals having a wavelength other than $\lambda_k$ to pass through, while reflecting (or coupling) the left-handed component of those signals, as well as the entire unpolarized signal of the wavelength $\lambda_k$. Similarly, if the chiral defect coupler 110 is a right-handed structure, then it allows the left-handed components of signals having a wavelength other than $\lambda_k$ to pass through, while reflecting (or coupling) the left-handed component of those signals, as well as the entire unpolarized signal of the wavelength $\lambda_k$.

The chiral defect coupler 110 may be a high index contrast structure having a width of all channels ($\lambda_1 \ldots \lambda_n$) approximately equal to $\Delta n/n$. The individual channel width is determined by the structure length as well as by the index contrast $\Delta n/n$ while spectral position is determined by the structure's pitch and/or a defect in the structure. The basic structure of the chiral defect coupler 110 includes two fibers positioned as to be in proximity with one another for a portion of their length (hereinafter "proximal portion"). A section of one of the fibers is configured to contain a CG structure 112 and a defect 1 14 is introduced into the structure 112. The defect may include but is not limited to: a spacing, a layer of a different optical material, or an axial twist between two portions of the structure 112. The CG fiber structures 102 and 104 may be produced and configured in a variety of advantageous embodiments described in connection with FIG. 3A except that a defect 114 is added to the structures. The commonly assigned copending U.S. Patent Application entitled "Chiral Twist Laser and Filter Apparatus and Method" which is hereby incorporated herein in its entirety, describes the chiral defect functionality in greater detail. The CG structure 112 is otherwise similar in construction and configuration to the CG structure 72 of FIG. 3A.

Figure 4B:
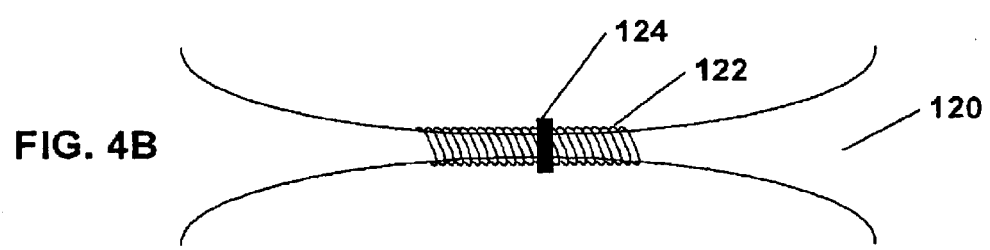
FIG. 4B is a schematic diagram of a second embodiment of a first type of a chiral defect coupler utilized in the inventive add-drop filter of FIG. 2 in accordance with the present invention.

Referring now to FIG. 4B, a second embodiment of a chiral defect coupler 120 is shown. The chiral defect coupler 120 may be configured to be utilized as the LH-CDCA 54 or RH-CDCA 60 of FIG. 2. The chiral defect coupler 120 is substantially similar in functionality to the chiral defect coupler 110 of FIG. 4A except that the CG fiber structure 122 encompasses both fibers rather than one of the fibers as in the chiral defect coupler 110. The defect 124 is configured similarly to the defect 114 of FIG. 4A. The CG fiber structure 122 may be produced and configured in a variety of advantageous embodiments described in connection with FIG. 3A.

Figure 4C:
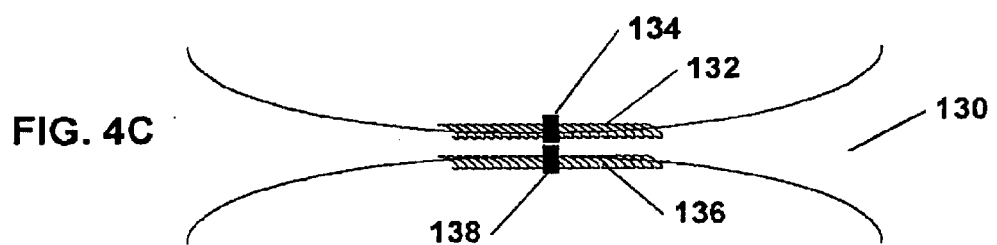
FIG. 4C is a schematic diagram of a third embodiment of a first type of a chiral defect coupler utilized in the inventive add-drop filter of FIG. 2 in accordance with the present invention.

Referring now to FIG. 4C, a third embodiment of a chiral defect coupler 130 is shown. The chiral defect coupler 130 may be configured to be utilized as the LH-CDCA 54 or RH-CDCA 60 of FIG. 2. The chiral defect coupler 130 is substantially similar in functionality to the chiral defect coupler 110 of FIG. 4A except that each of the two fibers in the chiral defect coupler 130 is provided with an individual proximal CG structure 132 and 136. The defects 134 and 138 are configured similarly to the defect 114 of FIG. 4A. The CG fiber structures 132 and 136 may be produced and configured in a variety of advantageous embodiments described in connection with FIG. 3A.

Figure 4D:
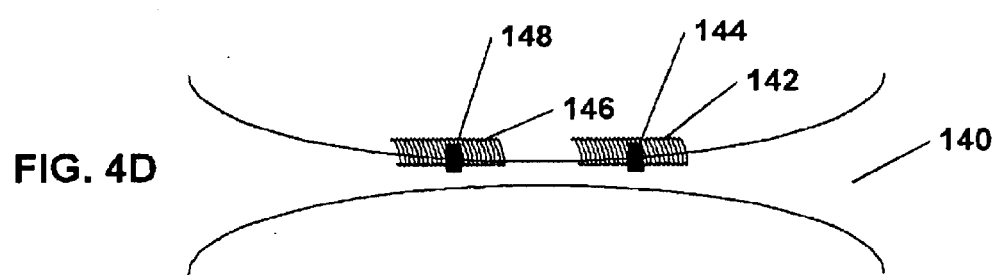
FIG. 4D is a schematic diagram of a fourth embodiment of a first type of a chiral defect coupler utilized in the inventive add-drop filter of FIG. 2 in accordance with the present invention.

Referring now to FIG. 4D, a fourth embodiment of a chiral defect coupler 140 is shown. The chiral defect coupler 140 may be configured to be utilized as the LH-CDCA 54 or RH-CDCA 60 of FIG. 2. The chiral defect coupler 140 is substantially similar in functionality to the chiral defect coupler 110 of FIG. 4A except that one of the fibers in the chiral defect coupler 140 is provided with two proximal CG structures 142 and 146. The defects 144 and 148 are configured similarly to the defect 114 of FIG. 4A. The CG fiber structures 142 and 146 may be produced and configured in a variety of advantageous embodiments described in connection with FIG. 3A. In an alternate embodiment of the chiral defect coupler 140, two additional proximal CG structures each with a defect may be position on the other fiber of the chiral coupler 140 (not shown) as a matter of design choice.

Figure 5:
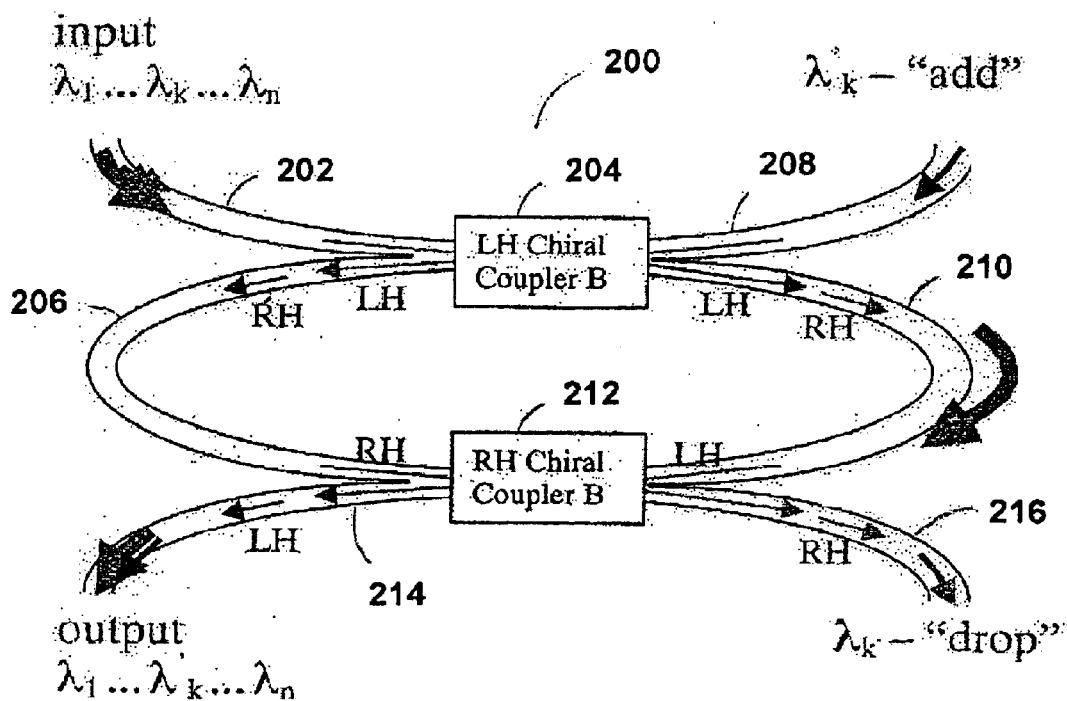
FIG. 5 is a schematic diagram of a third embodiment of an add-drop filter of the present invention.

Referring now to FIG. 5, a third embodiment of an inventive add-drop filter 200 is shown. The input signal containing the n channels (including the channel to be dropped at the wavelength $\lambda_k$) enters into the filter 200 through the input 202. Each signal in each channel of the input signal can be decomposed into both left-handed and right-handed circularly polarized components. The input signal encounters a Left-Handed Chiral Coupler B 204 (hereinafter "LH-CCB 204"), a low index contrast structure configured with a narrow reflection band centered at $\lambda_k$. The LH-CCB 204 is described in greater detail in connection with FIG. 6.

The LH-CCB 204 reflects the left-handed component of $\lambda_k$ into a fiber 206, while allowing signals in the rest of the input signal channels, as well as the right-handed component of $\lambda_k$ to pass through to a fiber 210. At the same time, the signal $\lambda_k$ to be added to the input signal at the wavelength $\lambda_k$ enters the filter 200 through the add channel 208 and has its left-handed component deflected by the LH-CCB 204 into the fiber 210, while its right-handed component passes through the LH-CCB 204 into the fiber 206.

The rest of the input signal and the right-handed component of the signal at $\lambda_k$ are directed to a Right-Handed Chiral Coupler B 212 (hereinafter "RH-CCB 212"), also configured with a redirection band centered at $\lambda_k$. Thus, the RH-CCB 212 redirects the right-handed component of the signal at $\lambda_k$ into a drop channel 216, while allowing the rest of the input signal channels arriving via the fiber 210 to pass through the RH-CCB 212 to an output channel 214. The left-handed component of the signal $\lambda_k$ arrives to the RH-CCB 212 via the fiber 206 and passes through to the drop channel 216. Thus, both the right- and left-handed components of the signal at $\lambda_k$ are directed to the drop channel 216, thereby removing the $\lambda_k$ signal from its channel in the input signal.

At the same time, the left-handed component of the new signal $\lambda'_k$ traveling via fiber 210 passes through the RH-CCB 212 and enters the output channel 26. The right-handed component of the new signal $\lambda'_k$ traveling via the fiber 206 is redirected by the RH-CCB 212 and also enters the output channel 214. Thus, both the right- and left-handed components of $\lambda'_k$ are directed to the output channel 214 thereby adding the $\lambda'_k$ signal to the $\lambda_k$ channel in the input signal. As a result, the add-drop filter 200 advantageously substitutes the $\lambda'_k$ signal for the $\lambda_k$ signal.

While the lengths of the fibers 206, 210 are shown to be substantially equal in FIG. 5, it should be understood, that the lengths of the fibers 206, 210 may be made different from one another to configure the filter 200 for specific applications as a matter of design choice without departing from the spirit of the invention.

Figure 6:
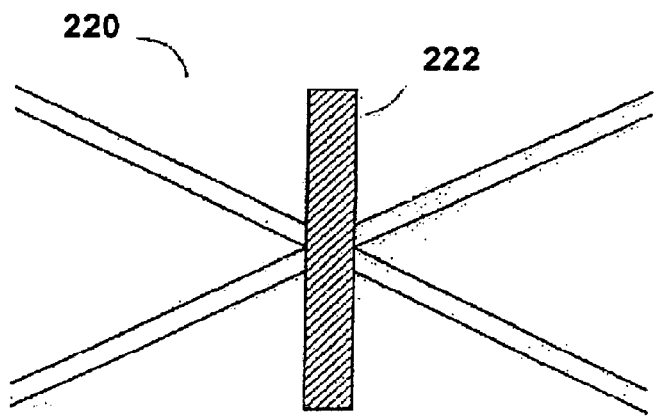
FIG. 6 is a schematic diagram of a second type of a chiral coupler utilized in the inventive add-drop filter of FIG. 5 in accordance with the present invention.

Referring now to FIG. 6, a first embodiment of a chiral coupler B 220 is shown. The chiral coupler 220 may be configured to be utilized as the LH-CCB 204 or RH-CCB 212 of FIG. 5. Thus, the chiral coupler 220 is configured either as a left-handed or a right-handed structure with a redirection band centered at $\lambda_k$. If the chiral coupler 220 is a left-handed structure, then it allows the right-handed component of $\lambda_k$ to pass through while redirecting the left-handed component. Similarly, if the chiral coupler 220 is a right-handed structure, then it allows the left-handed component of $\lambda_k$ to pass through while redirecting the right-handed component. Signals having a wavelength outside of the redirection band simply pass through the chiral coupler 220.

The chiral coupler 220 is a low index contrast structure with a channel width of approximately equal to $\Delta n/n$. Channel position determined by the pitch of the structure, so different channels require different pitch. The basic structure of the chiral coupler 220 includes two intersecting optical fibers having at least one chiral element 222 at their point of intersection. The chiral element 222 may be a chiral fiber grating, or a chiral (for example CLC) material element, such as a film. Alternately, the chiral element 222 may be configured as a chiral fiber grating on each of the intersecting fibers fused together at the point of the intersection (not shown). It should be noted that the chiral element 222 is shown in FIG. 6 by way of example only and is not shown in actual size and position in relation to the intersecting fibers.

Figure 7:
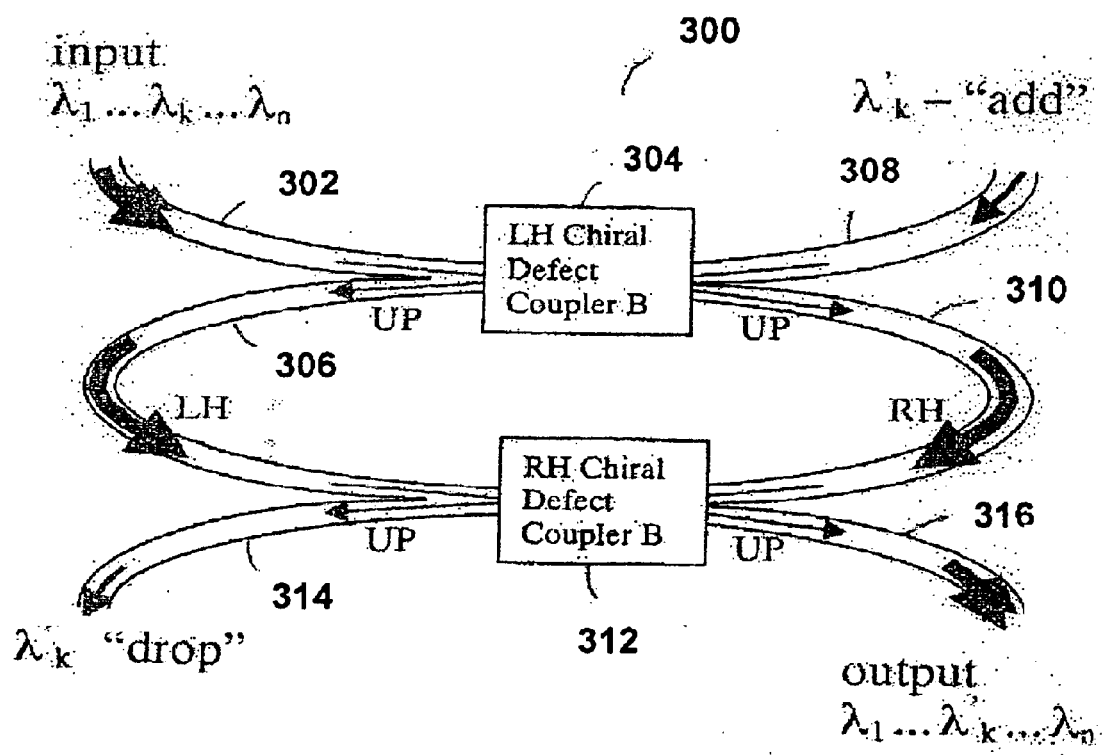
FIG. 7 is a schematic diagram of a fourth embodiment of an add-drop filter of the present invention.

Referring now to FIG. 7, a fourth embodiment of an inventive add-drop filter 300 is shown. The input signal containing the n channels (including the channel to be dropped at the wavelength $\lambda_k$) enters into the filter 300 through the input 302. The input signal encounters a Left-Handed Chiral Defect Coupler B 304 (hereinafter "LH-CDCB 304"), a high index contrast structure with a defect configured to redirect both polarization components at a predetermined defect wavelength of $\lambda_k$, while splitting other wavelengths into right- and left- circularly polarized components (also passing through right-handed components and redirecting left-handed components). The LH-CDCB 304 is described in greater detail in connection with FIG. 8.

Thus, the LH-CDCB 304 completely redirects unpolarized signal $\lambda_k$ into a fiber 306, while splitting the rest of the input signal channels into a right-handed polarized input component that passes through the LH-CDCB 304 into a fiber 310, and a left-handed polarized input component that is redirected into the fiber 306. At the same time, the new signal $\lambda'_k$ to be added to the input signal at the wavelength $\lambda_k$ enters the filter 300 through the add channel 308 and is completely redirected by the LH-CDCB 304 into the fiber 310.

The right-handed component of the input signal and the entire $\lambda'_k$ signal are directed to a Right-Handed Chiral Defect Coupler B 312 (hereinafter "RHCDCB 312"), also configured to completely redirect both components at the defect wavelength of $\lambda_k$ as well as any right-handed polarized signals. Thus, the new signal $\lambda'_k$ is redirected by the RH-CDCB 312 into an output channel 316, along with the right-handed component of the input signal. The left-handed component of the input signal is delivered to the RH-CDCB 312 via the fiber 306 and passes through to the output channel 316. The unpolarized signal $\lambda_k$, also delivered to the RH-CDCB 312 via the fiber 306, is redirected completely into a drop channel 314. Thus, the add-drop filter 300 advantageously substitutes the $\lambda'_k$ signal for the $\lambda_k$ signal.

While the lengths of the fibers 306, 310 are shown to be substantially equal in FIG. 7, it should be understood, that the lengths of the fibers 306, 310 may be made different from one another to configure the filter 300 for specific applications as a matter of design choice without departing from the spirit of the invention.

Figure 8:
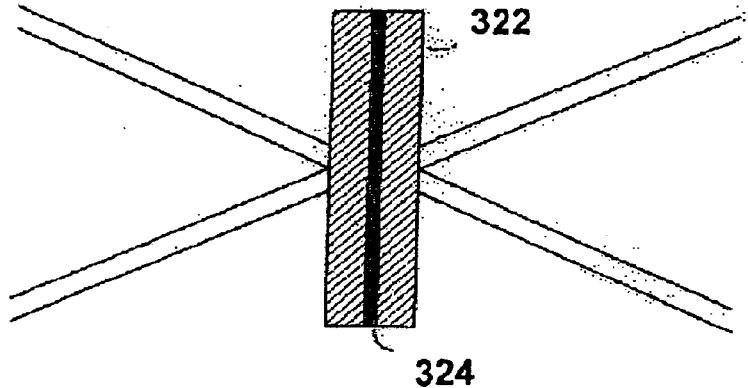
FIG. 8 is a schematic diagram of a second type of a chiral defect coupler utilized in the inventive add-drop filter of FIG. 7 in accordance with the present invention.

Referring now to FIG. 8, a first embodiment of a chiral defect coupler 320 is shown. The chiral defect coupler 320 may be configured to be utilized as the LH-CDCB 304 or RH-CDCB 312 of FIG. 7. Thus, the chiral defect coupler 320 is configured either as a left-handed or a right-handed structure with a defect configured to redirect both polarization components of a signal at a predetermined defect wavelength of $\lambda_k$, while splitting signals of other wavelengths into right- and left- circularly polarized components and passing through or redirecting those components in accordance with the handedness of the structure. If the chiral defect coupler 320 is a left-handed structure, then it allows the right-handed components of signals having a wavelength other than $\lambda_k$ to pass through, while redirecting the left-handed component of those signals, as well as the entire unpolarized signal of the wavelength $\lambda_k$. Similarly, if the chiral defect coupler 320 is a right-handed structure, then it allows the left-handed components of signals having a wavelength other than $\lambda_k$ to pass through, while redirecting the left-handed component of those signals, as well as the entire unpolarized signal of the wavelength $\lambda_k$.

The chiral defect coupler 320 may be a high index contrast structure having a width of all channels ($\lambda_1 \ldots \lambda_n$ channels) approximately equal to $\Delta n/n$. Individual channel width is determined by the structure length as well as by the index contrast $\Delta n/n$ while spectral position is determined by the defect or the structure's pitch. The basic structure of the chiral defect coupler 320 includes two intersecting optical fibers having at least one chiral defect element 322 at their point of intersection. The chiral defect element 322 may be a chiral fiber grating, or a chiral (for example CLC) material element, such as a film. Alternately, the chiral defect element 322 may be configured as a chiral fiber grating on each of the intersecting fibers fused together at the point of the intersection (not shown). It should be noted that the chiral defect element 322 is shown in FIG. 8 by way of example only and is not shown in actual size and position in relation to the intersecting fibers. The chiral defect element 322 also contains a defect 324. The defect 324 may include but is not limited to: a spacing between portions of the chiral defect element 322, a layer of a different optical material between the potions of the chiral defect element 322, or a twist between the portions.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps, which perform substantially the same function in substantially the same way to achieve the same results, are within the scope of the invention. It is the intention, therefore, to be limited only as indicated by the scope of the claims appended hereto.

We claim:

1. An add-drop passive optical filter for subtracting a drop signal from a target wavelength channel of a multi-channel main input signal and adding an add signal into said target wavelength channel, comprising:
   an input line for receiving the main input signal, the main input signal comprising a plurality of input signals in a plurality of channels and the drop signal in the target wavelength channel;
   an add line for delivering the add signal at the target wavelength to the input signal;
   a drop line for receiving the drop signal in the target wavelength channel separate from the main input signal;
   a pair of passive chiral couplers, each said passive chiral coupler having a predetermined redirection hand and being optically connected to one another and to at least one of said input, add, and drop lines, said passive chiral coupler pair being operable to passively:
      a) separate the drop signal from the main input signal to generate a modified main signal;
      b) direct the drop signal into said drop line;
      c) add the add signal to said modified main signal to generate an output signal; and
   an output line for receiving and transmitting said output signal from said passive chiral coupler pair.

2. The add-drop passive optical filter of claim 1, wherein a first passive chiral coupler of said pair of passive chiral couplers comprises:
   a first fiber element having a first end and a second end and a second fiber element comprising a third end and a fourth end, wherein said first fiber element comprises a first coupling section between said first and second ends, wherein said second fiber element comprises a second coupling section between said third and fourth ends, and wherein said first and second coupling sections are proximal to one another, and
   first passive chiral coupling means of a first handedness, disposed at at least one of said first and second coupling sections, for passively redirecting a first handedness component of a signal at the target wavelength, and for passing a second handedness component of said signal and other signals therethrough.

3. The add-drop passive optical filter of claim 2, wherein a second passive chiral coupler of said pair of passive chiral couplers comprises:
   a third fiber element having a fifth end and a sixth end and a fourth fiber element comprising a seventh end and an eighth end, wherein said third fiber element comprises a third coupling section between said fifth and sixth ends, wherein said fourth fiber element comprises a fourth coupling section between said seventh and eighth ends, and wherein said third and fourth coupling sections are proximal to one another, and
   second passive chiral coupling means of a second handedness, disposed at at least one of said third and fourth coupling sections, for redirecting said second handedness component of said signal at the target wavelength, and for passing said first handedness component of said signal and said other signals therethrough.

4. The add-drop passive optical filter of claim 3, wherein:
   said first passive chiral coupling means comprises a first passive chiral structure of said first handedness and having said predetermined redirection band at the target wavelength, said first passive chiral structure being operable to passively:
   redirect said first handedness component of said target wavelength signal traveling in a first direction in one of said first and second fiber elements into the other of said first and second fiber elements in a second direction; and
   pass said second handedness component of said target wavelength signal and said other signals through said one of said first and second fiber elements; and
   wherein said second passive chiral coupling means comprises a second passive chiral structure of said second handedness and having said predetermined redirection band at said target wavelength, said second passive chiral structure being operable to passively:
   redirect said second handedness component of said target wavelength signal traveling in said first direction in one of said third and fourth fiber elements into the other of said third and fourth fiber elements in said second direction, and
   pass said first handedness component of said target wavelength signal and said other signals through said one of said third and fourth fiber elements.

5. The add-drop passive optical filter of claim 4, wherein:
   said first passive chiral structure comprises at least one first chiral fiber grating disposed at at least one of said first and said second coupling sections; and
   said second passive chiral structure comprises at least one second chiral fiber grating disposed at at least one of said third and fourth coupling sections.

6. The add-drop passive optical filter of claim 5, wherein:
   each of said at least one first chiral fiber grating and said at least one second chiral fiber grating, comprises at least one of: a chiral fiber bragg grating and a chiral fiber long period grating.

7. The add-drop passive optical filter of claim 4, wherein:
   said first passive chiral structure comprises said first and said second coupling sections configured as a first common chiral fiber grating structure; and
   said second passive chiral structure comprises said third and fourth coupling sections configured as a second common chiral fiber grating structure.

8. The add-drop passive optical filter of claim 7, wherein:
   each of said first and second common chiral fiber grating structures comprises one of: a chiral fiber Bragg grating and a chiral fiber long period grating.

9. The add-drop passive optical filter of claim 4, wherein:
   said input line is optically connected to said first end, said second end is optically connected to said eighth end, said add line is optically connected to said fourth end, said third end is optically connected to said fifth end, said drop line is optically connected to said sixth end, and said output line is connected to said seventh end.

10. The add-drop passive optical filter of claim 1, wherein said first passive chiral coupler of said pair of passive chiral couplers comprises:
    a fifth fiber element having a ninth end and a tenth end, and a sixth fiber element having an eleventh end and a twelfth end, wherein said fifth fiber element comprises a fifth coupling section between said ninth and tenth ends, wherein said sixth fiber element comprises a sixth coupling section between said eleventh and twelfth ends, and wherein said fifth and sixth coupling sections are proximal to one another, and
    first defect passive chiral coupling means of a first handedness, disposed at at least one of said fifth and sixth coupling sections, for redirecting said signal at the target wavelength matching a defect wavelength, for splitting said other signals into first and second handedness components, for redirecting said first handedness components of said other signals, and for passing said second handedness components of said other signals therethrough.

11. The add-drop passive optical filter of claim 10, wherein said second passive chiral coupler of said pair of passive chiral couplers comprises:

a seventh fiber element having a thirteenth end and a fourteenth end, and an eighth fiber element having a fifteenth end and a sixteenth end, wherein said seventh fiber element comprises a seventh coupling section between said thirteenth and fourteenth ends, wherein said eighth fiber element comprises an eighth coupling section between said fifteenth and sixteenth ends, and wherein said seventh and eighth coupling sections are proximal to one another; and second defect passive chiral coupling means of a second handedness, disposed at at least one of said seventh and eighth coupling sections, for redirecting said signal at the target wavelength matching a defect wavelength, for splitting said other signals into said first and second handedness components, for redirecting said second handedness components of said other signals, and for passing said first handedness components of said other signals therethrough.

12. The add-drop passive optical filter of claim 11, wherein:

said first defect passive chiral coupling means comprises a first passive chiral defect structure of said first handedness, having said predetermined redirection band at the target wavelength and a first defect at said defect wavelength, said first passive chiral defect structure being operable to:

redirect said target wavelength signal traveling in said first direction in one of said fifth and sixth fiber elements into the other of said fifth and sixth fiber elements in said second direction;

split said other signals into said first and second handedness components;

redirect said first handedness components of said other signals traveling in said first direction in one of said fifth and sixth fiber elements into the other of said fifth and sixth fiber elements in a second direction; and pass said second handedness components of said other signals through said one of said fifth and sixth fiber elements; and wherein said second defect passive chiral coupling means comprises a second passive chiral defect structure of said second handedness, having said predetermined redirection band at said target wavelength and a second defect at said defect wavelength, said second chiral defect structure being operable to:

redirect said target wavelength signal traveling in a first direction in one of said seventh and eighth fiber elements into the other of said seventh and eighth fiber elements in said second direction;

split said other signals into said first and second handedness components;

redirect said second handedness components of said other signals traveling in said first direction in one of said seventh and eighth fiber elements into the other of said seventh and eighth fiber elements in said second direction; and pass said first handedness components of said other signals through said one of said seventh and eighth fiber elements.

13. The add-drop passive optical filter of claim 12, wherein:

said first passive chiral defect structure comprises at least one third chiral fiber grating having said first defect therein, and being disposed at at least one of said fifth and sixth coupling sections; and said second passive chiral defect structure comprises at least one fourth chiral fiber grating having said second defect therein, and being disposed at at least one of said seventh and eighth coupling sections.

14. The add-drop passive optical filter of claim 13, wherein each of said at least one third chiral defect fiber grating and said at least one fourth chiral defect fiber grating, comprises one of: a chiral fiber bragg grating and a chiral fiber long period grating.

15. The add-drop passive optical filter of claim 12, wherein:

said first passive chiral defect structure comprises said fifth and sixth coupling sections configured as a first common chiral defect fiber grating structure; and said second passive chiral defect structure comprises said seventh and eighth coupling sections configured as a second common chiral defect fiber grating structure.

16. The add-drop passive optical filter of claim 15, wherein:

each of said first and second common chiral defect fiber grating structures comprises one of: a chiral fiber bragg grating and a chiral fiber long period grating.

17. The add-drop passive optical filter of claim 12, wherein:

said first defect comprises at least one of: spacing between two portions of said first chiral defect structure, additional dielectric material between two portions of said first passive chiral defect structure, and an axial twist between two portions of said first passive chiral defect structure; and said second defect comprises at least one of: spacing between two portions of said second passive chiral defect structure, additional dielectric material between two portions of said second passive chiral defect structure, and an axial twist between two portions of said second passive chiral defect structure.

18. The add-drop passive optical filter of claim 12, wherein said input line is optically connected to said ninth end, said tenth end is optically connected to said sixteenth end, said add line is optically connected to said twelfth end, said eleventh end is optically connected to said thirteenth end, said drop line is optically connected to said fifteenth end, and said output line is connected to said fourteenth end.

19. The add-drop passive optical filter of claim 1, wherein said first passive chiral coupler of said pair of passive chiral couplers comprises:

a ninth fiber element having a seventeenth end and an eighteenth end and a tenth fiber element having a nineteenth end and a twentieth end, wherein said ninth and tenth fiber elements intersect with one another at a first intersection area; and third passive chiral coupling means of a first handedness, disposed at said first intersection area, for redirecting said first handedness component of said signal at the target wavelength, and for passing said second handedness component and said other signals therethrough.

20. The add-drop passive optical filter of claim 19, wherein a second passive chiral coupler of said pair of passive chiral couplers comprises:

an eleventh fiber element having a twenty-first end and a twenty-second end and a twelfth fiber element having a twenty-third end and a twenty-fourth end, wherein said eleventh and twelfth fiber elements intersect with one another at a second intersection area; and fourth passive chiral coupling means of a second handedness, disposed at said second intersection area, for redirecting said second handedness component of said signal at the target wavelength, and for passing said first handedness component and said other signals therethrough.

21. The add-drop passive optical filter of claim 20, wherein:

said third passive chiral coupling means comprises a third passive chiral structure of said first handedness and having said predetermined redirection band at said target wavelength, said third passive chiral structure being operable to passively:

redirect a first handedness component of said target wavelength signal traveling in said first direction in one of said ninth and tenth fiber elements into the other of said ninth and tenth fiber elements in said second direction; and pass said second handedness component of said target wavelength signal and said other signals through said one of said ninth and tenth fiber elements; and wherein said fourth passive chiral coupling means comprises a fourth passive chiral structure of said second handedness and having said predetermined redirection band at said target wavelength, said fourth passive chiral structure being operable to passively:

redirect said second handedness component of said target wavelength signal traveling in said first direction in one of said eleventh and twelfth fiber elements into the other of said eleventh and twelfth fiber elements in said second direction, and pass said first handedness component of said target wavelength signal and said other signals through said one of said eleventh and twelfth fiber elements.

22. The add-drop passive optical filter of claim 21, wherein:

said third passive chiral structure comprises at least one third chiral fiber grating disposed at said first intersection area; and said fourth passive chiral structure comprises at least one fourth chiral fiber grating disposed at said second intersection area.

23. The add-drop passive optical filter of claim 22, wherein:

each of said at least one third chiral fiber grating and at least one fourth chiral fiber grating comprises one of: a chiral fiber bragg grating and a chiral fiber long period grating.

24. The add-drop passive optical filter of claim 21, wherein:

said third passive chiral fiber structure comprises a first cholesteric liquid crystal element positioned at said first intersection area; and said fourth passive chiral fiber structure comprises a second cholesteric liquid crystal element positioned at said second intersection area.

25. The add-drop passive optical filter of claim 24, wherein:

each of said first and second cholesteric liquid crystal elements is a film.

26. The add-drop passive optical filter of claim 21, wherein:

said input line is optically connected to said nineteenth end, said eighteenth end is optically connected to said twenty-third end, said add line is optically connected to said seventeenth end, said twentieth end is optically connected to said twenty-first end, said drop line is optically connected to said twenty-fourth end, and said output line is connected to said twenty-second end.

27. The add-drop passive optical filter of claim 1, wherein said first passive chiral coupler of said pair of passive chiral couplers comprises:

a thirteenth fiber element having a twenty-fifth end and a twenty-sixth end, and a fourteenth fiber element having a twenty-seventh end and a twenty-eighth end, wherein said thirteenth and fourteenth fiber elements intersect with one another at a third intersection area; and third defect passive chiral coupling means of a first handedness, disposed at said third intersection area, for redirecting said signal at the target wavelength matching said defect wavelength, for splitting said other signals into said first and second handedness components, for redirecting said first handedness components of said other signals, and for passing said second handedness components of said other signals therethrough.

28. The add-drop passive optical filter of claim 27, wherein said second passive chiral coupler of said pair of passive chiral couplers comprises:

a fifteenth fiber element having a twenty-ninth end and a thirtieth end, and a sixteenth fiber element having a thirty-first end and a thirty-second end, wherein said fifteenth and sixteenth fiber elements intersect with one another at a fourth intersection area; and fourth defect passive chiral coupling means of a second handedness, disposed at said fourth intersection area, for redirecting said signal at the target wavelength matching said defect wavelength, for splitting said other signals into said first and second handedness components, for redirecting said second handedness components of said other signals, and for passing said first handedness components of said other signals therethrough.

29. The add-drop passive optical filter of claim 28, wherein:

said third defect passive chiral coupling means comprises a third chiral defect structure of said first handedness, having said predetermined redirection band at said target wavelength and a third defect at said defect wavelength, said third chiral defect structure being operable to passively:

redirect said target wavelength signal traveling in said first direction in one of said thirteenth and fourteenth fiber elements into the other of said thirteenth and fourteenth fiber elements in said second direction;

split said other signals into said first and second handedness components;

redirect said first handedness components of said other signals traveling in said first direction in one of said thirteenth and fourteenth fiber elements into the other of said thirteenth and fourteenth fiber elements in said second direction; and pass said second handedness components of said other signals through said one of said thirteenth and fourteenth fiber elements; and wherein said fourth defect passive chiral coupling means comprises a fourth passive chiral defect structure of said second handedness, having said predetermined redirection band at said target wavelength and a fourth defect at said defect wavelength, said fourth passive chiral defect structure being operable to passively:

redirect said target wavelength signal traveling in said first direction in one of said fifteenth and sixteenth fiber elements into the other of said fifteenth and sixteenth fiber elements in said second direction;

split said other signals into said first and second handedness components;

redirect said second handedness components of said other signals traveling in said first direction in one of said fifteenth and sixteenth fiber elements into the other of said fifteenth and sixteenth fiber elements in said second direction; and pass said first handedness components of said other signals through said one of said fifteenth and sixteenth fiber elements.

30. The add-drop passive optical filter of claim 29, wherein:

said third passive chiral defect structure comprises at least one fifth chiral fiber grating having said third defect, and being disposed at said third intersection area; and said fourth passive chiral defect structure comprises at least one sixth chiral fiber grating having said fourth defect, and being disposed at said fourth intersection area.

31. The add-drop passive optical filter of claim 30, wherein:

each of said at least one fifth chiral defect fiber grating and said at least one sixth chiral defect fiber grating, comprises at least one of: a chiral fiber bragg grating and a chiral fiber long period grating.

32. The add-drop passive optical filter of claim 29, wherein:

said third passive chiral defect structure comprises a third cholesteric liquid crystal element, having said third defect, and being positioned at said third intersection area; and said fourth passive chiral defect structure comprises a fourth cholesteric liquid crystal element, having said fourth defect, and being positioned at said fourth intersection area.

33. The add-drop passive optical filter of claim 32, wherein each of said third and fourth cholesteric liquid crystal elements is a film.

34. The add-drop passive optical filter of claim 29, wherein:

said third defect comprises at least one of: spacing between two portions of said third passive chiral defect structure, additional dielectric material between two portions of said third passive chiral defect structure, and an axial twist between two portions of said third passive chiral defect structure; and said fourth defect comprises at least one of: spacing between two portions of said fourth passive chiral defect structure, additional dielectric material between two portions of said fourth passive chiral defect structure, and an axial twist between two portions of said fourth passive chiral defect structure.

35. The add-drop passive optical filter of claim 29, wherein said input line is optically connected to said twenty-seventh end, said twenty-sixth end is optically connected to said thirty-first end, said add line is optically connected to said twenty-fifth end, said twenty-eighth end is optically connected to said twenty-ninth end, said drop line is optically connected to said thirtieth end, and said output line is connected to said thirty-second end.

36. A passive chiral coupler for separating at least a portion of a target signal at a target wavelength from a main signal, comprising:

a first fiber element having a first end and a second end and a second fiber element comprising a third end and a fourth end, wherein said first fiber element comprises a first coupling section between said first and second ends, wherein said second fiber element comprises a second coupling section between said third and fourth ends, and wherein said first and second coupling sections are proximal to one another; and first passive chiral coupling means of a first handedness, disposed at at least one of said first and second coupling sections, for redirecting a first handedness component of the target signal at the target wavelength, and for passing a second handedness component of the target signal and the main signal therethrough.

37. The chiral coupler of claim 36, wherein said first passive chiral coupling means comprises a first passive chiral structure of said first handedness and having said predetermined redirection band at said target wavelength, said first passive chiral structure being operable to passively:

redirect a first handedness component of the target signal at said target wavelength traveling in a first direction in one of said first and second fiber elements into the other of said first and second fiber elements in a second direction; and pass said second handedness component of the target signal and the main signal through said one of said first and second fiber elements.

38. The passive chiral coupler of claim 37, wherein said first passive chiral structure comprises at least one first chiral fiber grating disposed at at least one of said first and said second coupling sections.

39. The passive chiral coupler of claim 38, wherein:

said at least one first chiral fiber grating comprises one of: a chiral fiber bragg grating and a chiral fiber long period grating.

40. The passive chiral coupler of claim 37, wherein said first passive chiral fiber structure comprises said first and said second coupling sections configured as a first common chiral fiber grating structure.

41. The passive chiral coupler of claim 40, wherein said first common chiral fiber grating structure comprises one of: a chiral fiber bragg grating and a chiral fiber long period grating.

42. A passive chiral coupler for separating at least a portion of a target signal at a target wavelength from a main signal, comprising:

a first fiber element having a first end and a second end and a second fiber element comprising a third end and a fourth end, wherein said first fiber element comprises a first coupling section between said first and second ends, wherein said second fiber element comprises a second coupling section between said third and fourth ends, and wherein said first and second coupling sections are proximal to one another; and first defect passive chiral coupling means of a first handedness, disposed at at least one of said first and second coupling sections, for redirecting the target signal at the target wavelength matching a defect wavelength, for splitting the main signals into first and second handedness components, for redirecting said first handedness main signal component, and for passing said second handedness main signal component therethrough.

43. The passive chiral coupler of claim 42, wherein said first defect passive chiral coupling means comprises a first passive chiral defect structure of said first handedness, having said predetermined redirection band at the target wavelength and a first defect at said defect wavelength, said first passive chiral defect structure being operable to:

redirect the target signal traveling in a first direction in one of said first and second fiber elements into the other of said first and second fiber elements in a second direction;

split the main signal into said first and second handedness components;

redirect said first handedness component of the main signal traveling in said first direction in one of said first and second fiber elements into the other of said first and second fiber elements in said second direction; and pass said second handedness components of the main signal through said one of said first and second fiber elements.

44. The passive chiral coupler of claim 43, wherein said first passive chiral defect structure comprises at least one second chiral fiber grating having said first defect, and being disposed at at least one of said first and second coupling sections.

45. The passive chiral coupler of claim 44, wherein said at least one second passive chiral defect fiber grating comprises one of: a chiral fiber bragg grating and a chiral fiber long period grating.

46. The passive chiral coupler of claim 43, wherein said first passive chiral defect structure comprises said first and second coupling sections configured as a common chiral defect fiber grating structure.

47. The passive chiral coupler of claim 46, wherein said common chiral defect fiber grating structure comprises one of: a chiral fiber bragg grating and a chiral fiber long period grating.

48. The passive chiral coupler of claim 43, wherein said first defect comprises at least one of: spacing between two portions of said first passive chiral defect structure, additional dielectric material between two portions of said first passive chiral defect structure, and an axial twist between two portions of said first passive chiral defect structure.

49. A passive chiral coupler for separating at least a portion of a target signal at a target wavelength from a main signal, comprising:

a first fiber element having a first end and a second end and a second fiber element comprising a third end and a fourth end, wherein said first and second fiber elements intersect with one another at a first intersection area; and first passive chiral coupling means of a first handedness, disposed at said first intersection area, for redirecting a first handedness component of the target signal at the target wavelength, and for passing a second handedness component of the target signal and the main signal therethrough.

50. The passive chiral coupler of claim 49, wherein said first passive chiral coupling means comprises a first passive chiral structure of said first handedness and having said predetermined redirection band at said target wavelength, said first passive chiral structure being operable to passively:

redirect a first handedness component of the target signal at said target wavelength traveling in a first direction in one of said first and second fiber elements into the other of said first and second fiber elements in a second direction; and pass said second handedness component of the target signal and the main signal through said one of said first and second fiber elements.

51. The passive chiral coupler of claim 48, wherein said first passive chiral structure comprises at least one first chiral fiber grating disposed at said first intersection area.

52. The passive chiral coupler of claim 51, wherein said at least one first chiral fiber grating comprises at least one of: a chiral fiber bragg grating and a chiral fiber long period grating.

53. The passive chiral coupler of claim 51, wherein said first passive chiral fiber structure comprises a cholesteric liquid crystal element positioned at said first intersection area.

54. The passive chiral coupler of claim 51, wherein said cholesteric liquid crystal element is a film.

55. A passive chiral coupler for separating at least a portion of a target signal at a target wavelength from a main signal, comprising:

a first fiber element having a first end and a second end and a second fiber element comprising a third end and a fourth end, wherein said first and second fiber elements intersect with one another at a first intersection area; and first defect passive chiral coupling means of a first handedness, disposed at said first intersection area, for redirecting the target signal at the target wavelength matching a defect wavelength, for splitting the main signals into first and second handedness components, for redirecting said first handedness main signal component, and for passing said second handedness main signal component therethrough.

56. The passive chiral coupler of claim 55, wherein said first defect passive chiral coupling means comprises a first passive chiral structure of said first handedness and having said predetermined redirection band at the target wavelength and a first defect at said defect wavelength, said first passive chiral defect structure being operable to passively:

redirect the target signal traveling in a first direction in one of said first and second fiber elements into the other of said first and second fiber elements in a second direction;

split the main signal into said first and second handedness components;

redirect said first handedness component of the main signal traveling in said first direction in one of said first and second fiber elements into the other of said first and second fiber elements in said second direction; and pass said second handedness components of the main signal through said one of said first and second fiber elements.

57. The passive chiral coupler of claim 56, wherein said first passive chiral structure comprises at least one first chiral fiber grating having said first defect, and being disposed at said first intersection area.

58. The passive chiral coupler of claim 57, wherein said at least one first chiral defect fiber grating comprises at least one of: a chiral fiber bragg grating and a chiral fiber long period grating.

59. The passive chiral coupler of claim 56, wherein said first passive chiral defect structure comprises a cholesteric liquid crystal element positioned at said first intersection area.

60. The passive chiral coupler of claim 59, wherein said cholesteric liquid crystal element is a film.

61. The passive chiral coupler of claim 56, wherein said first defect comprises at least one of: spacing between two portions of said first passive chiral defect structure, additional dielectric material between two portions of said first passive chiral defect structure, and an axial twist between two portions of said first passive chiral defect structure.

62. A method for subtracting a drop signal from a target wavelength channel of a multi-channel main input signal and adding an add signal into said target wavelength channel, comprising the steps of:
- (a) providing a pair of passive chiral couplers, each said passive chiral coupler each having a predetermined redirection band and being optically connected to one another and to at least one of input, add, and drop lines
- (b) passively separating, by at least one of said pair of passive chiral couplers, the drop signal from the main input signal to generate a modified main signal;
- (c) passively directing, by at least one of said pair of passive chiral couplers, the drop signal into said drop line;
- (d) passively adding, by at least one of said pair of passive chiral couplers, the add signal to said modified main signal to generate an output signal; and
- (e) providing an output line for receiving and transmitting said output signal from said passive chiral coupler pair.

63. A method, implemented in a passive chiral coupler, for separating at least a portion of a target signal at a target wavelength from a main signal comprising the steps of:
- (a) passively redirecting a first handedness component of the target signal at the target wavelength; and
- (b) passively passing a second handedness component of the target signal and the main signal therethrough.

64. A method, implemented in a passive chiral defect coupler, for separating at least a portion of a target signal at a target wavelength from a main signal comprising the steps of:
- (a) passively redirecting the target signal at the target wavelength matching a defect wavelength;
- (b) passively splitting the main signals into first and second handedness components;
- (c) passively redirecting said first handedness main signal component; and
- (d) passively passing said second handedness main signal component therethrough.

* * * * *